United States Patent
Brinker et al.

(10) Patent No.: US 8,200,592 B2
(45) Date of Patent: Jun. 12, 2012

(54) SYSTEM AND METHOD FOR MODELING MULTILABEL CLASSIFICATION AND RANKING

(75) Inventors: Klaus Brinker, Princeton, NJ (US); Claus Neubauer, Monmouth Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 948 days.

(21) Appl. No.: 11/668,676

(22) Filed: Jan. 30, 2007

(65) Prior Publication Data

US 2007/0198507 A1 Aug. 23, 2007

Related U.S. Application Data

(60) Provisional application No. 60/771,324, filed on Feb. 8, 2006.

(51) Int. Cl.
*G06N 5/00* (2006.01)
(52) U.S. Cl. ............................................. 706/20; 706/45
(58) Field of Classification Search ................... 706/20, 706/45
See application file for complete search history.

(56) References Cited

OTHER PUBLICATIONS

Brinker, et al., A Unified Model for Multilabel Classification and Ranking, 17th European Conference on Artificial Intelligence Riva del Garda, Italy / Aug. 28-Sep. 1, 2006, pp. 1-5.*
The Generation of Fuzzy Rules from Decision Trees, J. Advanced Comput. Intell, 1998, pp. 1-10.*
Hall, et al., The Generation of Fuzzy Rules from Decision Trees, J. Advanced Comput. Intell, 1998, pp. 1-10.*

* cited by examiner

*Primary Examiner* — Wilbert L Starks

(57) ABSTRACT

The present invention provides methods and apparatus for determining and utilizing detection models, such as models for machine condition monitoring. Specifically, the present invention provides a method for identifying and prioritizing labeled data. The model allows a monitored system to be associated with a calibrated and ordered set of states. Further, in machine condition monitoring, the machine condition is associated with the entire set of states in a particular order with a relevance zero-point. That is, a ranked set of calibrated data describing machine conditions is augmented with an annotation indicating a cut-off between relevant and non-relevant data.

31 Claims, 4 Drawing Sheets

SYSTEM AND METHOD FOR MODELING MULTILABEL CLASSIFICATION AND RANKING

This application claims priority to U.S. Provisional Patent Application Ser. No. 60/771,324, filed Feb. 8, 2006, entitled "A UNIFIED MODEL FOR MULTILABEL CLASSIFICATION AND RANKING," the content of which is hereby incorporated herein by reference in its entirety for all purposes.

FIELD OF THE INVENTION

The present invention relates generally to machine learning, and more particularly to models for multilabel classification and ranking.

BACKGROUND OF THE INVENTION

As industrial machinery has become more complex, machine condition monitoring has received increased attention and evolved into one of the most effective tools for maximizing the economic life-span of industrial machinery in various fields of application. Advanced machine learning techniques are among the key components for sophisticated monitoring systems and provide a means to automatically learn fault diagnosis models from sensor data (e.g., annotated historical data). One of the particular advantages of machine learning in condition monitoring is that the underlying diagnosis models can be adapted both to different application fields and time-shifting monitoring environments.

Arguably one of the most elementary scenarios in machine condition monitoring is to consider only two orthogonal states, namely, the alert state indicating that the system requires specific attention to prevent possible failure or damage and the non-alert state. More sophisticated systems model the machine to be associated with exactly one state from a finite, and typically small, set of alternatives. Systems such as these support a more fine-grained monitoring process such as a green, orange, and red alert scale, where the system states are assumed to be mutually exclusive. Adding even more flexibility, the machine condition might be characterized by a set of states (e.g., failure, alert, etc.) such that more than one state can be applicable at a particular point in time. Prior models of a multi-alert system considered multiple binary monitoring systems where each binary system indicates whether a particular subsystem is in a critical (e.g., relevant, active, and/or alert) state.

With increasingly complex industrial machinery, the need to detect and/or remedy faults (e.g., alerts, failures, etc.) early has become critical. However, prior methods of modeling these faults cannot support a ranking functionality and/or learn to determine a cut-off between active and non-active fault states (e.g., relevant and non-relevant faults), even when this information is specified in the training data.

SUMMARY OF THE INVENTION

The present invention provides improved methods and apparatus for creating a detection model for use in machine condition monitoring. The improved detection model includes a partition between relevant and non-relevant labels in set of labeled, ranked data. Accordingly, the improved detection model indicates a cut-off between active and non-active fault states in machine condition monitoring.

In a first aspect of the invention, a method for creating a model is provided. The method includes receiving a set of labels, ranking the set of labels, partitioning the ranked set of labels into a first subset of labels and a second subset of labels, and inserting a zero-point between the first subset of labels and the second subset of labels.

In other aspects, a detection model comprising a zero-point between a first subset of labels and a second subset of labels is utilized in machine condition monitoring. In some aspects, the model may determine when an output of machine faults (e.g., results from sensors) makes up a relevant fault. That is, the model may determine if the faults are more relevant than the zero-point.

Numerous other aspects are provided.

DETAILED DESCRIPTION

The present invention generally provides methods and apparatus for determining (e.g., constructing) and utilizing models of fault diagnoses for use in machine condition monitoring. More specifically, the present invention provides a method for identifying and prioritizing fault diagnoses in machine condition monitoring. The model allows a monitored system to be associated with a labeled (e.g., annotated, etc.) and ordered (e.g., ranked) set of states (e.g., alerts, faults, conditions, diagnoses, levels, etc.). Further, the machine condition is associated with the entire set of states in a particular order with a relevance zero-point. That is, a ranked set of calibrated data describing machine conditions is augmented with an annotation indicating a cut-off between relevant and non-relevant data.

Figure 1:
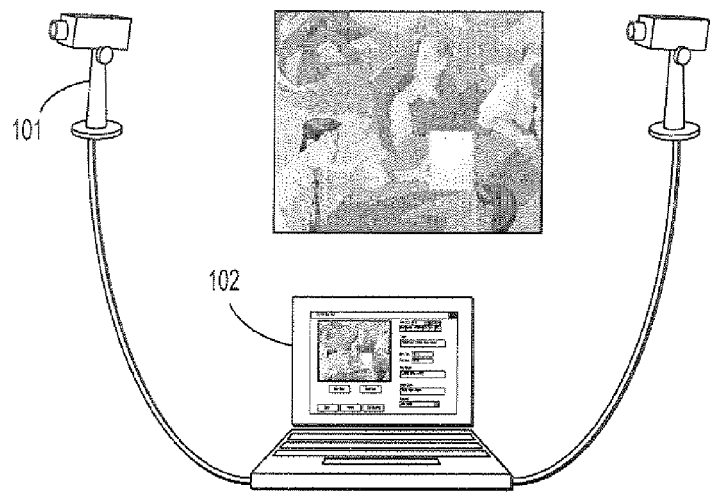
FIG. 1 depicts a method for constructing a detection model according to embodiments of the present invention.

FIG. 1 depicts a method 100 for constructing a detection model according to embodiments of the present invention. The method begins at step 102.

In step 104, a data set is acquired. The data set may, for example, be a set of training data. The training data may comprise data acquired from sensors employed on and/or about industrial machinery, data in a sensor data archive, and/or data from another source. The sensor data may, for example, be a set of data from pressure sensors, temperatures sensors, etc.

In step 106, the data set is labeled. Here the sensor (e.g., fault) data may be annotated and/or labeled to indicate the relevance (e.g., severity) and/or explain the fault. The data may be labeled by an expert (e.g., a human intervener) or, in some instances, by a computer program or similar architecture. In the context of training data, historical sensor data may be acquired in step 104 and labeled for modeling and training purposes here in step 106.

In step 108, the labeled data set is ranked. The data set may be ranked via ranking by pairwise comparison (RPC), constraint classification, expert ranking, and/or any other suitable ranking method.

Ranking of the labeled data may be described as instances $x \in X$ to rankings $\succ_x$ (total strict orders) over a finite set of labels $L=\{\lambda 1, \ldots, \lambda c\}$, where $\lambda i \succ_x \lambda j$ means that, for instance x, label $\lambda i$ is preferred to $\lambda j$. A ranking over L can be represented by a permutation as there exists a unique permutation $\tau$ such that $\lambda i \succ_x \lambda j$ iff $\tau(\lambda i) < \tau(\lambda j)$, where $\tau(\lambda i)$ denotes the position of the label $\lambda i$ in the ranking.

Following the ranking by any appropriate means in step 108, the ranked (e.g., ordered) data set is partitioned into subsets in step 110. The data set may be partitioned into a first subset, which may include all relevant labels, and a second subset, which may include all non-relevant labels. In some embodiments, there may be more or less subsets. Additionally, any of the subsets may be an empty set. That is, there may be no relevant labels (e.g., the first subset is an empty set) and/or there may be no non-relevant labels (e.g., the second subset is an empty set).

In step 112, a zero-point is inserted between the partitioned subsets. That is, a relevance zero-point (e.g., a virtual label) may be placed such that the virtual label may be preferable to all non-relevant labels and less preferable than all relevant labels.

The virtual label, which may be represented as $\lambda 0$, may be a split point between the relevant and non-relevant labels such that a calibrated ranking may be represented as:

$$\lambda i_1 \succ_x \ldots \succ_x \lambda i_j \succ_x \lambda 0 \succ_x \lambda i_{j+1} \succ_x \ldots \succ_x \lambda i_c, \text{where c is the total number of labels.}$$

Based on the labeled, ranked, and partitioned data including the virtual label, a model may be produced in step 114. This model may provide a calibrated label ranking which provides additional information about the ranking of the labels and may also improve the discrimination between relevant and non-relevant labels.

Such a model may be represented as $h: X \rightarrow S^0_c$, wherein X is a nonempty input space and $S^0_c$ is the space of permutations over the set $\{\lambda 0, \lambda 1, \ldots, \lambda c\}$. The calibrated ranking above induces a ranking among the labels, namely:

$$\lambda i_1 \succ_x \ldots \succ_x \lambda i_j \succ_x \lambda i_{j+1} \succ_x \ldots \succ_x \lambda i_c.$$

The ranked labels are partitioned (step 110) with a bipartite partition into:

$$P=\{\lambda i_1, \ldots, \lambda i_j\} \text{ and } N=\{\lambda i_{j+1}, \ldots, \lambda i_c\}.$$

Training information for a multilabel ranking model may comprise a set of preferences $R_x$, and subsets of labels $P_x$, $N_x \subset L$ with $P_x \cap N_x = \emptyset$, which distinguish, respectively, positive labels that should be ranked above the zero-point element $\lambda 0$ and negative labels to be ranked below. The bipartite partitions associated with the training instances is used to, with the help of the virtual label $\lambda 0$, induce additional constraints: the calibrated classifier h should predict $\lambda \succ_x \lambda 0$ for all $\lambda \in P_x$ and likewise $\lambda 0 \succ_x \lambda'$ for all $\lambda' \in N_x$. Moreover, as a consequence of transitivity, it should predict $\lambda \succ_x \lambda'$ for all $\lambda \in P_x$ and $\lambda' \in N_x$. Combining the new partition-induced preference constraints with the original set of pairwise preferences for the training data, e.g., $$R'_x \text{def} = R_x \cup \{(\lambda, \lambda 0) | \lambda \in P_x\}$$

$$\cup \{(\lambda 0, \lambda') | \lambda' \in N_x\}$$

$$\cup \{(\lambda, \lambda') | \lambda \in P_x \lambda' \in N_x\},$$

the calibrated ranking model is produced.

Here, inserting a zero-point between a subset of relevant labels and a subset of non-relevant labels may also be understood to mean predicting the zero-point and/or determining a zero-point.

The method ends at step 116.

It is noted that the method 100 for constructing a model, as described above, may also be modified to train a model. That is, a set of sensor data (e.g., sensor values for a given machine condition) is acquired in step 104 and annotated in step 106. This sensor data is ranked in step 108 and grouped into subsets (e.g., active and non-active states) in step 110, where a zero-point may be inserted between the subsets in step 112. This set of sensor values together with the bipartition of the set of labels forms a set of training data. This set of training data may be used to train a model for predicting the calibrated ranking of states with new sensor data.

Figure 2:
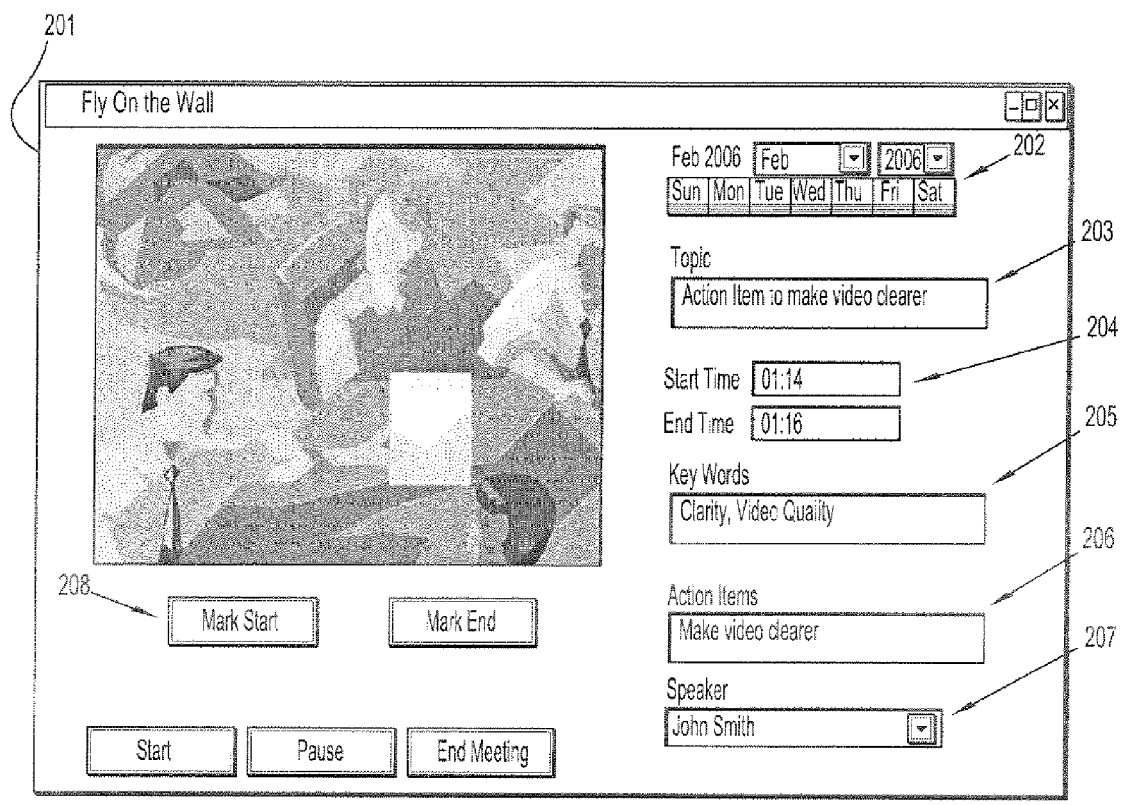
FIG. 2 is a schematic illustration of a detection model according to embodiments of the present invention.

FIG. 2 is a schematic illustration of a detection model 200 according to an embodiment of the present invention. In such an embodiment, detection model 200 is used in machine condition monitoring. The machine condition may be associated with the entire set of states (e.g., diagnoses level, alert states, etc.) in a particular order with a relevance zero-point. As discussed above, the detection model 200 may be pre-determined and/or may be learned using training data.

The detection model 200 of FIG. 2 may comprise one or more ordered sets 202a-c. Though depicted here with three alternative ordered sets 202a-c, it is understood that a detection model 200 may comprise any number of ordered sets 202. Detection model 200 may, for example, be a model of the type constructed using method 100 of FIG. 1.

For example, a machine (not shown) may utilize detection model 200 and may be assigned ordered set 202a. The ordered set 202a may comprise relevant labels 204a-b (e.g., relevant alerts), which correspond to alert states 1 and 3, respectively. Thus, relevant labels 204a-b may make up the relevant subset 206, wherein relevant label 204a (e.g., alert state 1) is considered more critical and/or more likely than relevant label 204b (e.g., alert state 3). The ordered set 202a may further comprise non-relevant labels 208a-b (e.g., non-relevant alerts), which correspond to non-alert states 4 and 2, respectively. Thus, non-relevant labels 208a-b make up the non-relevant subset 210, wherein non-relevant label 208a (e.g., alert state 4) is considered more critical and/or more likely than non-relevant label 208b (e.g., alert state 2). A virtual label 212 (e.g., a virtual alert state) may be inserted between relevant subset 206 and non-relevant subset 210. The virtual label 212 may indicate the labels preceding it (e.g., labels 204a-b) are relevant and/or more critical than those labels following it (e.g., labels 208a-b). Thus, the ordered set 202a may be a detection model 200.

Similarly, ordered set 202b may be a calibrated ranking in detection model 200. The ordered set 202b may comprise relevant label 214 (e.g., the relevant alert), which corresponds to alert state 4. Thus, relevant label 214 makes up the relevant subset 216. The ordered set 202b may further comprise non-relevant labels 218a-c (e.g., the non-relevant alerts), which correspond to non-alert states 2, 1, and 3, respectively. Thus, non-relevant labels 218a-c make up the non-relevant subset 220, wherein non-relevant label 218a (e.g., alert state 2) is considered more critical and/or more likely than non-relevant label 218b (e.g., alert state 1), which is in turn considered more critical and/or more likely than non-relevant label 218c (e.g., alert state 3). A virtual label 222 (e.g., a virtual alert state) may be inserted between relevant subset 216 and non-relevant subset 220. The virtual label 212 may indicate the label(s) preceding it (e.g., label 214) are relevant and/or more critical than those labels following it (e.g., labels 218a-c).

In still another example of a detection model 200, the model 200 may comprise ordered set 202c. The ordered set 202c may comprise virtual label 224 (e.g., a virtual alert state) with no preceding relevant subset. This may also be considered as a detection model 200 wherein the relevant subset is an empty set. The ordered set 202c may further comprise non-relevant labels 226a-d (e.g., the non-relevant alerts), which correspond to non-alert states 1, 2, 3, and 4, respectively. Thus, non-relevant labels 226a-d make up the non-relevant subset 228. In this way, the machine condition may be said to be in an overall non-alert (e.g., non-relevant) state.

Figure 3:
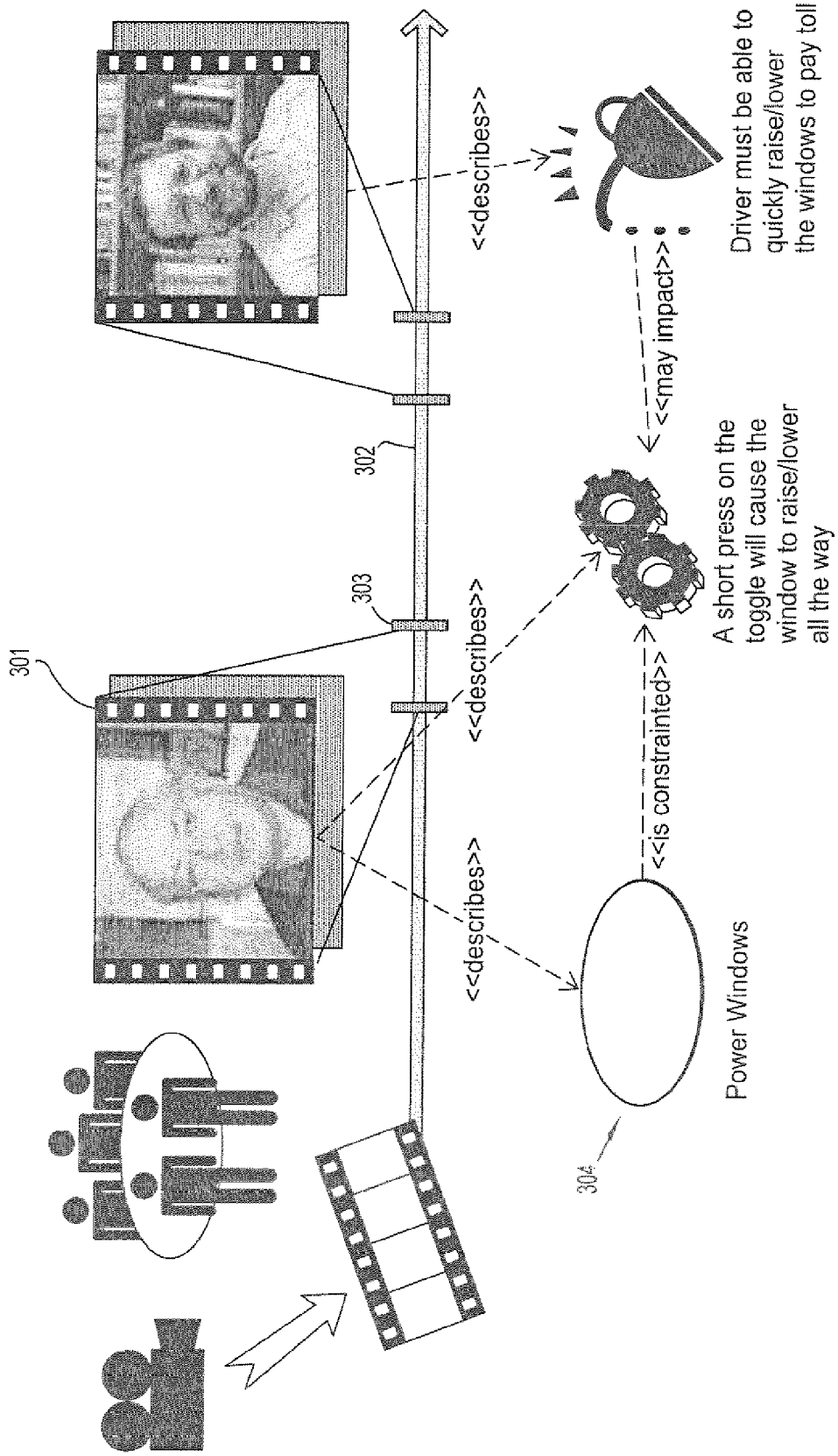
FIG. 3A illustrates a set of labels representing a prior art multilabel classification problem.
FIG. 3B illustrates the introduction of a virtual label into a model according to some embodiments of the present invention.
FIG. 3C illustrates a set of preferences representing a calibrated label ranking model.

FIG. 3A illustrates a set of labels representing a prior art multilabel classification problem, which may serve as a basis for constructing a model according to the present invention. As in step 110 of method 100, the ranked data may be partitioned into subsets 302 and 304. As discussed similarly above with respect to FIG. 2, relevant subset 302 comprises relevant labels 306a-c (e.g. $\lambda 1$, $\lambda 2$, and $\lambda 3$) and non-relevant subset 304 comprises non-relevant labels 308a-d (e.g., $\lambda 4$, $\lambda 5$, $\lambda 6$, $\lambda 7$). In conventional methods of multilabel classification training information may comprise a subset of labels 302 (e.g., $P_x$) of relevant labels and, implicitly, a subset 304 (e.g., $N_x = L \setminus P_x$) of non-relevant labels. It is understood that this information may be transformed into a set of preferences $R'_x = \{(\lambda, \lambda') | \lambda \in P_x \wedge \lambda' \in N_x\}$. In this way, each label 306a-c of the relevant subset 302 may be shown to be preferred to each label 308a-d of the non-relevant subset 304.

FIG. 3B illustrates the introduction of a virtual label 310 between the relevant subset 302 and the non-relevant subset 304. Training information for a multilabel ranking model, such as the detection model 200, may comprise a set of preferences $R_x$, and subsets 302, 304, such that: $P_x, N_x \subset L$ with $P_x \cap N_x = \emptyset$, which distinguish, respectively, relevant labels 306a-c that should be ranked above the virtual label 310 (e.g., $\lambda 0$) and non-relevant labels 308a-d to be ranked below. The bipartite partitions associated with the training instances may be used to, with the help of the virtual label 310, induce additional constraints: the calibrated classifier h should predict $\lambda \succ_{xx} \lambda 0$ for all $\lambda \in P_x$ and likewise $\lambda 0 \succ_{xx} \lambda'$ for all $\lambda' \in N_x$, as shown in FIG. 3B.

FIG. 3C illustrates a set of preferences representing a calibrated label ranking model, such as the detection model 200. As a consequence of transitivity, the detection model 200 should predict $\lambda \succ_{xx} \lambda'$ for all $\lambda \in P_x$ and $\lambda' \in N_x$. Combining the new partition-induced preference constraints with the original set of pairwise preferences for the training data, e.g., $$R'_x \text{def} = R_x \cup \{(\lambda, \lambda 0) | \lambda \in P_x\}$$

$$\cup \{(\lambda 0, \lambda') | \lambda' \in N_x\}$$

$$\cup \{(\lambda, \lambda') | \lambda \in P_x \wedge \lambda' \in N_x\},$$

the detection model 200, calibrated label ranking model, becomes amenable to previous approaches to the original label ranking setting.

The detection model 200 may be learned by solving a conventional ranking problem in the augmented calibrated hypothesis space, which may be viewed as a ranking problem with c+1 alternatives, with respect to the modified sets of constraints $R'_x$ on the original labels $\lambda 1, \ldots, \lambda c$ and the virtual label $\lambda 0$. Therefore, this unified approach to the calibrated setting enables many existing techniques, such as RPC and constraint classification to incorporate and exploit partition-related preference information and to generalize to settings where predicting the zero-point is required.

Figure 4:
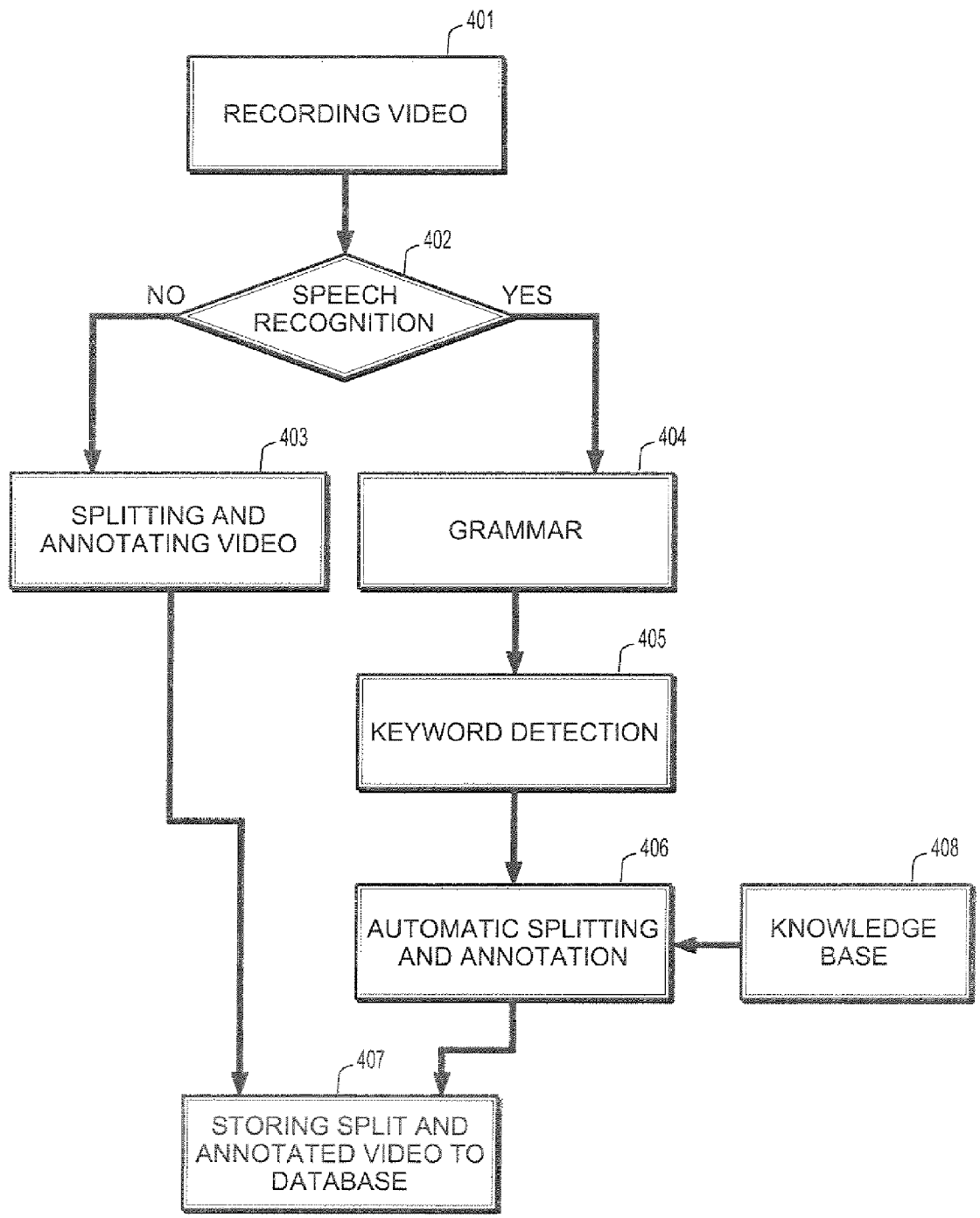
FIG. 4 is a schematic depiction of a system for use in machine condition monitoring according to embodiments of the present invention.

FIG. 4 is a schematic depiction of a system 400 for use in machine condition monitoring and/or producing a detection model according to embodiments of the present invention. The system includes a controller 402 programmed to carry out the various detection and/or control methods and/or functions performed in the system 400. Controller 402 may be coupled to machine 404 and a plurality of sensors 406 so as to pass information therebetween. Sensors 406 may also be coupled to machine 404 so as to pass information therebetween.

The controller 402 may include one or more memory devices 408, which may be suitable for storing a program to control the controller 402 and/or storing a detection model 200. Additionally and/or alternatively, memory device 408 may comprise a detection model, which may be similar to detection model 200 described above.

Further, controller 402 and/or memory device 408 may be adapted to receive data from sensors 406 and store the data as historical sensor data and/or training data. The controller 402 and/or memory device 408 may be further adapted to utilize this data to construct and/or produce a detection model based on this data. The functions described herein with relation to controller 402 and/or memory device 408 may be performed by one or more computer processors that are executing computer program code, which defines the functionality described herein. One skilled in the art will also recognize that the functionality described herein may be implemented using hardware, software, and various combinations of hardware and software.

Further, one or more of the steps of method 100, method 500, or any other methods described herein may be implemented as one or more computer program products stored in a suitable computer readable medium (e.g., a carrier wave signal, hard drive, random access memory, etc.) on or about controller 402 and/or memory device 408.

For example, with respect to the method 100 of FIG. 1, the controller 402 and/or memory device 408 may acquire a data set from the sensors 406 in step 104. Alternatively, acquiring the data set may comprise using the controller 402 to retrieve the data set from the memory device 408 or another storage location. In step 106, the data set is labeled. In practice, the data set stored on the memory device 408 may be labeled by the controller 402, the memory device 408, and/or an outside source (e.g., an expert). Additionally and/or alternatively, the data set may already be labeled such that the data set received in step 104 is a set of labels.

In step 108, the data set is ranked by the controller 402, the memory device 408, and/or an outside source. In step 110 the controller 402 and/or the memory device 408 partition the labels into a first subset of labels and a second subset of labels. In alternative embodiments, the data set is partitioned into multiple (e.g., 2, 3, 4, 5, etc.) subsets of labels. Following partitioning, the controller 402 and/or memory device inserts a zero-point between the first subset of labels and the second subset of labels. In alternative embodiments comprising more than two subsets of labels, the zero-point is inserted between any two subsets of labels.

Figure 5:
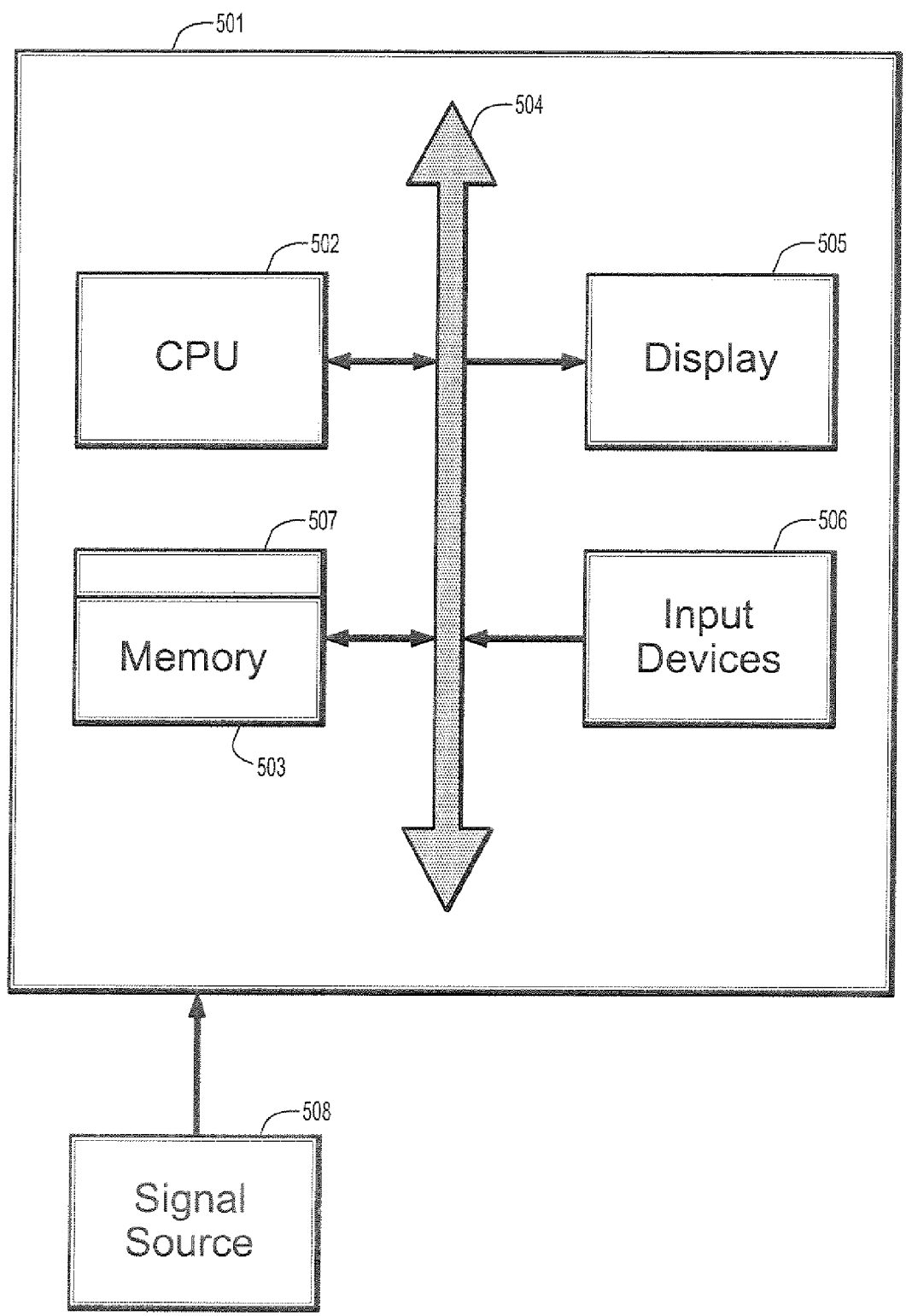
FIG. 5 depicts a method for machine condition monitoring using a detection model according to embodiments of the present invention.

FIG. 5 depicts a method 500 for machine condition monitoring using a detection model according to embodiments of the present invention. The method begins at step 502.

In step 504, sensor (e.g., alert, machine, fault, etc.) conditions are detected by the sensors 406 at one or more machines 404. The sensor conditions are transmitted to the controller 402.

In step 506, the controller 402 receives the sensor conditions from the sensors 406, receives and/or enables a detection model 200, and evaluates the sensor conditions with the detection model 200 by applying the sensor conditions for each of the plurality of sensors to the detection model 200. It is understood that the detection model 200 may be in residence at the controller 402 and/or may be generated therefrom and may therefore perform the functions ascribed to the controller 402, as described above.

In step 508, the relevance of the sensor conditions received from the sensors 406 is predicted by the detection model 200 employed by the controller 402. If the sensor conditions are predicted and/or determined to be relevant as described above with respect to detection model 200, the method passes to step 510 and a fault alert is output. The fault alert of step 510 may comprise a machine condition, an alert, a ranking of critical faults amongst the sensors, a specified order in which an operator should address the faults, and/or any other appropriate response. The detection model 200 may be used to predict the relevancy of the monitored sensor conditions. That is, the detection model 200 may be employed in a machine learning environment such that the detection model 200 may be used to predict the multi-label ranking of fault states. In other words, the detection model 200 may itself or be used to predict a zero-point between a subset of relevant labels and a subset of non-relevant labels, as discussed above. Here, predicting a zero-point between a subset of relevant labels and a subset of non-relevant labels may be understood to mean that the detection model 200 may predict the zero-point, the detection model 200 may be employed in a machine learning environment to predict a zero-point, the detection model 200 may use a predetermined zero-point, and/or any other appropriate means of determining (e.g., predicting) a zero-point between a subset of relevant labels and a subset of non-relevant labels. In this way, the detection model 200 may determine if at least a first subset of the sensor conditions received from the sensors 406 is consistent with the predicted relevant subset of labels.

If the sensor conditions are determined to be non-relevant as described above with respect to detection model 200 (e.g., no subset of the fault conditions received from the sensors 406 is consistent with the predicted relevant subset of labels), the method passes back to step 504 for further fault and/or sensor monitoring. A machine condition such as indicating the machine is not in a fault condition may be output here. The method continues in this loop until passed through step 510 in a fault alert to the method end at step 512.

The foregoing description discloses only the preferred embodiments of the invention, modifications of the above disclosed systems and methods which fall within the scope of the invention will be readily apparent to those of ordinary skill in the art. For instance, additional, alternative, and/or overlapping models having a partition between relevant and non-relevant labels may be utilized for machine condition monitoring. Additionally, though described herein as a model for use in machine condition monitoring, it is understood that the methods of determining the model and/or employing the constructed models may be utilized in any applicable fields with similarly constructed data (e.g., text categorization, bioinformatics, etc).

Accordingly, while the present invention has been disclosed in connection with the preferred embodiments thereof, it should be understood that other embodiments may fall within the spirit and scope of the invention as defined by the following claims.

What is claimed is:

1. A method for creating a model comprising:
receiving a set of labels;
ranking the set of labels;
partitioning, by a processor, the ranked set of labels into a first subset of labels and a second subset of labels; and,
inserting, by a processor, a zero-point label between the first subset of labels and the second subset of labels, wherein the zero-point label represents a split point between the first subset of labels and the second subset of labels.

2. The method of claim 1 wherein ranking the set of labels is accomplished by pairwise classification.

3. The method of claim 1 wherein ranking the set of labels is accomplished by constraint classification.

4. The method of claim 1 wherein the first subset of labels are relevant and the second subset of labels are non-relevant.

5. The method of claim 1 wherein the first subset of labels is an empty set.

6. The method of claim 1 wherein the second subset of labels is an empty set.

7. The method of claim 1 wherein the set of labels is a set of annotated sensor data.

8. An apparatus for creating a model comprising:
means for receiving a set of labels;
means for ranking the set of labels;
means for partitioning the ranked set of labels into a first subset of labels and a second subset of labels; and,
means for inserting a zero-point label between the first subset of labels and the second subset of labels, wherein the zero-point label represents a split point between the first subset of labels and the second subset of labels.

9. The apparatus of claim 8 wherein the means for ranking the set of labels comprises means for pairwise classification of the set of labels.

10. The apparatus of claim 8 wherein the means for ranking the set of labels comprises means for constraint classification of the set of labels.

11. The apparatus of claim 8 wherein the first subset of labels are relevant and the second subset of labels are non-relevant.

12. The apparatus of claim 8 wherein the first subset of labels is an empty set.

13. The apparatus of claim 8 wherein the second subset of labels is an empty set.

14. The apparatus of claim 8 wherein the set of labels is a set of annotated sensor data.

15. A computer program product for creating a model comprising:
a non-transitory medium readable by a computer, the computer readable medium having computer program code adapted to:
receive a set of labels;
rank the set of labels;
receive partition information for the ranked set of labels, wherein the partition information partitions the ranked set of labels into a first subset of labels and a second subset of labels;
receive zero-point information for the ranked set of labels, wherein the zero-point information inserts a zero-point label between the first subset of labels and the second subset of labels, wherein the zero-point label represents a split point between the first subset of labels and the second subset of labels; and,
produce a model based on the received partition information and the received zero-point information.

16. The computer program product of claim 15 wherein the computer program code is further adapted to:
partition the ranked set of labels into a first subset of labels and a second subset of labels; and,
insert a zero-point between the first subset of labels and the second subset of labels.

17. The computer program product of claim 15 wherein the computer program code is further adapted to rank the set of labels by pairwise classification.

18. The computer program product of claim 15 wherein the computer program code is further adapted to rank the set of labels by constraint classification.

19. The computer program product of claim 15 wherein the first subset of labels are relevant and the second subset of labels are non-relevant.

20. A method of machine condition monitoring comprising:
   monitoring a plurality of sensors adapted to detect machine condition information;
   evaluating the machine condition information by employing a calibrated label ranking model predicting a zero-point label between a first subset of labels and a second subset of labels, wherein the zero-point label represents a split point between the first subset of labels and the second subset of labels; and,
   outputting an evaluated machine condition from the calibrated label ranking model based on the machine condition information.

21. The method of claim 20 wherein the first subset of labels are relevant and the second subset of labels are non-relevant.

22. The method of claim 20 wherein the first subset of labels is an empty set.

23. The method of claim 20 wherein the second subset of labels is an empty set.

24. The method of claim 20 wherein employing a calibrated label ranking model comprises:
   determining a fault condition for each of the plurality of monitored sensors;
   applying the fault conditions for each of the plurality of monitored sensors to the calibrated ranking model predicting a zero-point between a first subset of labels and a second subset of labels; and,
   determining if the first subset of the labels is consistent with a first subset of the fault conditions.

25. The method of claim 20 further comprising:
   generating the calibrated label ranking model based on a set of training data prior to monitoring the plurality of sensors.

26. A system for machine condition monitoring comprising:
   a plurality of machine sensors adapted to detect machine condition information; and,
   an evaluator adapted to:
      receive machine condition information from the plurality of machine sensors;
      employ a calibrated label ranking model predicting a zero-point label between a first subset of labels and a second subset of labels, wherein the zero-point label represents a split point between the first subset of labels and the second subset of labels; and,
      output an evaluated machine condition from the calibrated label ranking model based on the machine condition information.

27. The system of claim 26 wherein the first subset of labels are relevant and the second subset of labels are non-relevant.

28. The system of claim 26 wherein the first subset of labels is an empty set.

29. The system of claim 26 wherein the second subset of labels is an empty set.

30. The system of claim 26 wherein the evaluator is further adapted to:
   determine a fault condition for each of the plurality of monitored sensors;
   apply the fault conditions for each of the plurality of monitored sensors to the calibrated ranking model predicting a zero-point between a first subset of labels and a second subset of labels; and,
   determine if the first subset of the labels is consistent with a first subset of the fault conditions.

31. The system of claim 26 wherein the evaluator is further adapted to:
   apply a set of training data to the calibrated label ranking model.

* * * * *